(12) United States Patent
Bawden

(10) Patent No.: US 11,058,105 B1
(45) Date of Patent: Jul. 13, 2021

(54) ADJUSTABLE BALLAST KEEL FOR BALANCED FLOATING

(71) Applicant: Robert Michiel Bawden, West Jordan, UT (US)

(72) Inventor: Robert Michiel Bawden, West Jordan, UT (US)

(73) Assignee: Robert Michael Bawden, West Jordan, UT (US)

( * ) Notice: Subject to any disclaimer, the term of this patent is extended or adjusted under 35 U.S.C. 154(b) by 231 days.

(21) Appl. No.: 16/282,031

(22) Filed: Feb. 21, 2019

Related U.S. Application Data

(60) Provisional application No. 62/608,734, filed on Dec. 21, 2017.

(51) Int. Cl.
*A01M 31/06* (2006.01)

(52) U.S. Cl.
CPC .................................. *A01M 31/06* (2013.01)

(58) Field of Classification Search
CPC ....... A01M 31/06; A01M 31/00; A63H 23/00; A63H 23/02; A63H 23/10; A63B 2225/605
See application file for complete search history.

(56) References Cited

U.S. PATENT DOCUMENTS

| 3,733,733 A * | 5/1973 | Ruter | A01M 31/06 43/3 |
| 9,078,425 B1 * | 7/2015 | Heiges | A01M 31/06 |
| 9,084,716 B1 * | 7/2015 | Bawden | A01M 31/06 |
| 2016/0324142 A1 * | 10/2016 | Stirling | A01M 31/06 |

* cited by examiner

*Primary Examiner* — Joshua J Michener
*Assistant Examiner* — Henry Hooper Mudd
(74) *Attorney, Agent, or Firm* — Plager Schack LLP

(57) ABSTRACT

A decoy assembly is configured to have an adjustable buoyancy level. The decoy assembly has a head assembly with a decoy head. A decoy body has a body planar bottom surface and a head opening configured to accommodate the head assembly. The head assembly further has a head keel bracket, joined to the planar bottom surface. A head weight is joined to the head keel bracket and configured to lower a head assembly center of gravity. The decoy assembly has body keel brackets and body keel weights joined to the body keel bracket at the planar bottom surface and configured to lower the body assembly center of gravity. Adjusting the body assembly center of gravity independently of the head assembly center of gravity provides lifelike movement for the decoy assembly and allows the orientation of the decoy to be varied for a natural looking presentation.

3 Claims, 3 Drawing Sheets

ADJUSTABLE BALLAST KEEL FOR BALANCED FLOATING

BACKGROUND

The embodiments herein relate generally to an adjustable Ballast Keel bracket system that solves the problem of unbalanced floatation in high riding decoys where the floating object flip or fall on its side due to imbalance. Existing ballast brackets have fixed keels that cannot be adjusted causing imbalance and flipping. The embodiment of adjustable Ballast Keel described here provides the ability to add weight through the keel's ports that can be distributed throughout the keel to control buoyancy levels in floating objects and maintain them in upright floating position. The invention claimed here solves this problem.

SUMMARY

A decoy assembly is configured to have an adjustable buoyancy level. The decoy assembly has a head assembly with a decoy head. A decoy body has a body planar bottom surface and a head opening configured to accommodate the head assembly. The head assembly further has a head keel bracket, joined to the planar bottom surface. A head weight is joined to the head keel bracket and configured to lower a head assembly center of gravity. The decoy assembly has body keel brackets and body keel weights joined to the body keel bracket at the planar bottom surface and configured to lower the body assembly center of gravity. Adjusting the body assembly center of gravity independently of the head assembly center of gravity provides lifelike movement for the decoy assembly and allows the orientation of the decoy to be varied for a natural looking presentation.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
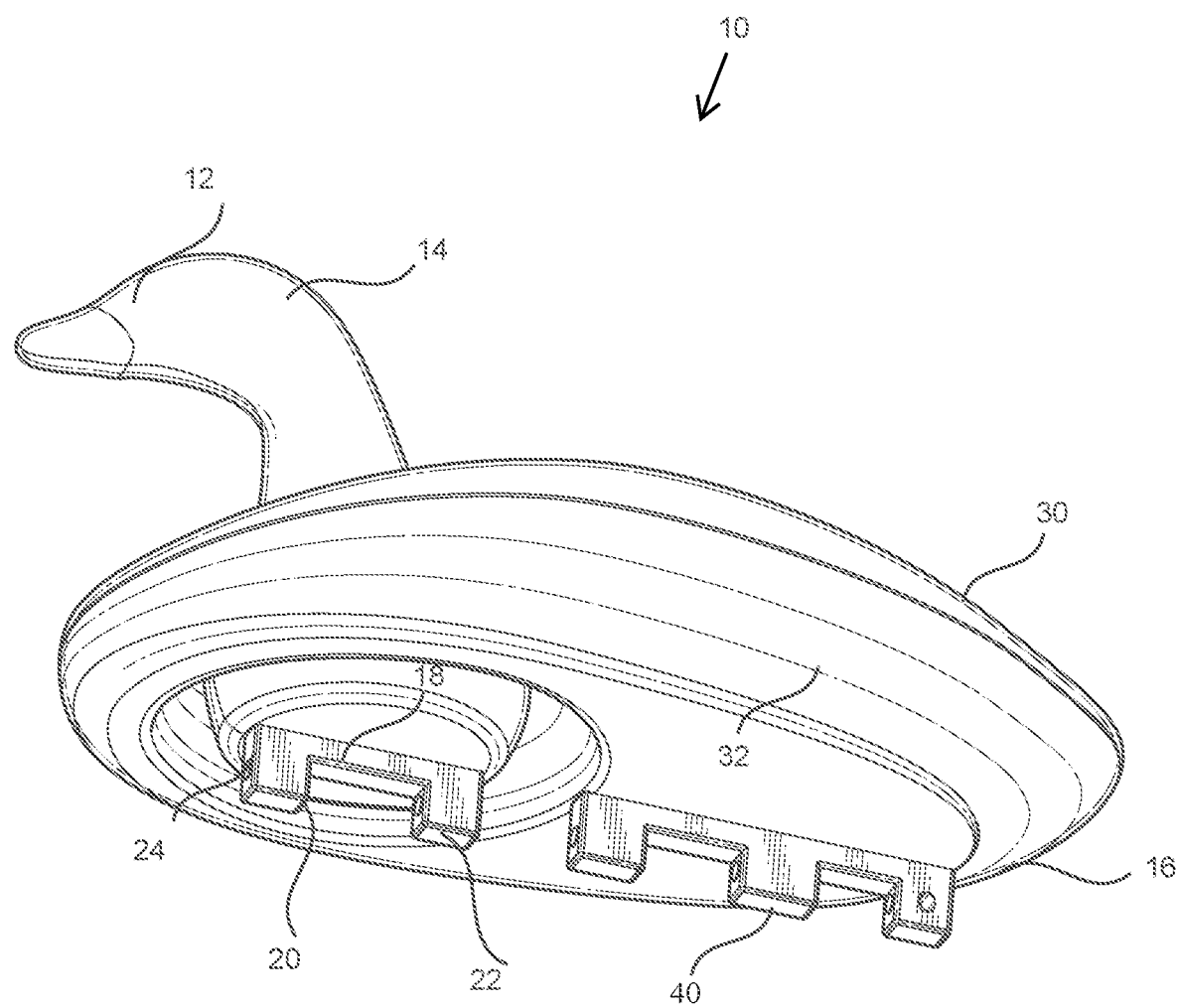
FIG. 1 is a perspective view of the decoy with the brackets constructed in accordance with the present invention

By way of example, and referring to FIG. 1, one embodiment of the present system comprises a decoy 10 comprising of a head 12 connected to the body of the floating decoy head 14 and had having a planar bottom surface 16 a head keel bracket 18, joined to the planar bottom surface, and further comprising a first head keel bracket 20 joined to a second head keel bracket 22 with a head keel opening 24 there between.

Figure 2:
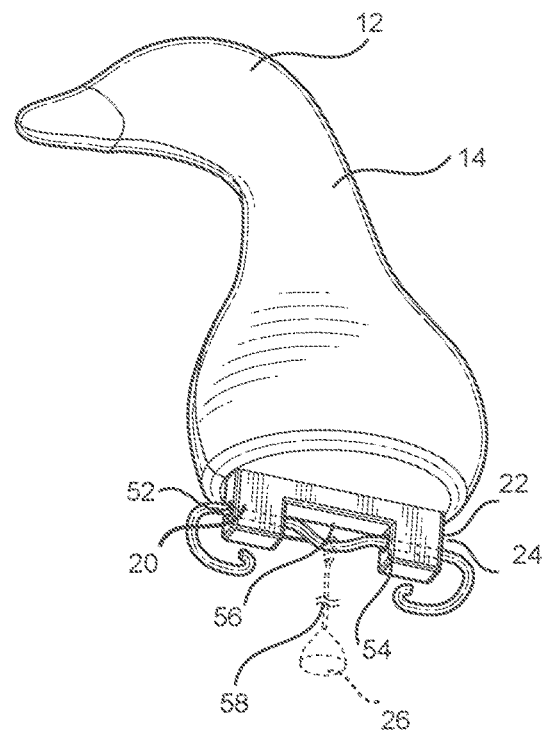
FIG. 2 is a view of the head portion of the decoy with attached bracket looking up from the bottom of the vessel, showing the ballast positioned for sailing up wind.
Figure 3:
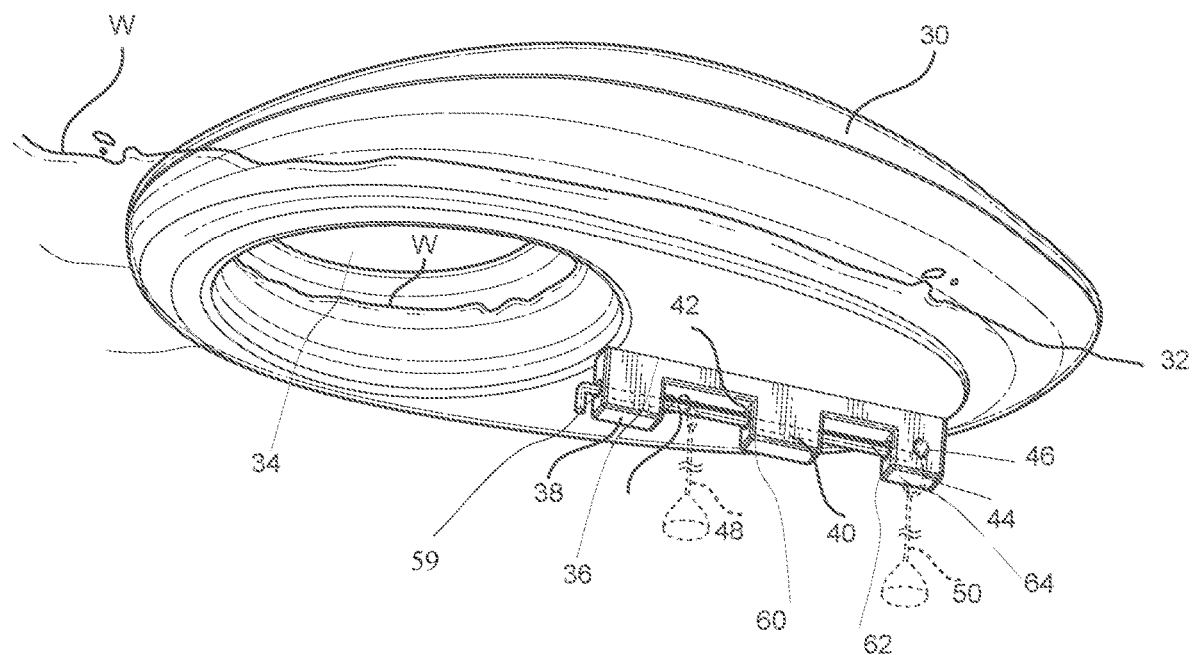
FIG. 3 is detailed view of the base of the decoy with attached brackets looking up from the bottom of the vessel of the ballast positioned for sailing downwind.

By way of example, and referring to FIGS. 2-3 one embodiment of the present system comprises a decoy 10 comprising of a head 12 connected to a head weight 26 joined to the head keel bracket and configured to lower a head assembly center of gravity; a body assembly 30, further comprising a decoy body 32 had having a body planar bottom surface and a head opening 34 configured to accommodate the head assembly.

By way of example, and referring to FIG. 3 one embodiment of the present system comprises a body keel bracket 36, joined to the body planar bottom surface, and further comprising a first body keel bracket 38 joined to a second body keel bracket 40 with a body keel opening 42 therebetween; a third body keel bracket 44, joined to the second body keel bracket with a second body keel opening 46 there between; a first body weight 48 joined to the body keel bracket and configured to lower a body assembly center of gravity; a second body weight 50, joined to the body keel bracket and configured to lower a body assembly center of gravity wherein adjusting the body assembly center of gravity independently of the head assembly center of gravity provides lifelike movement for the decoy assembly.

By way of example and referring to FIGS. 1-3 one embodiment of the present system comprises a body keel bracket further comprising a first head heel bracket port 52, arranged through the first head keel bracket; a second head heel bracket port 54, arranged through the second head keel bracket; a head keel bracket line 56, threaded through the first head heel bracket port and the second head heel bracket port; wherein the head keel bracket line is joined to the head weight with a head weight line 58.

By way of example and referring to FIG. 3 the decoy assembly, further comprising a first body heel bracket port 59, arranged through the first body keel bracket 38; a second body heel bracket port 60, arranged through the second body keel bracket 40; a third body heel bracket port 62, arranged through the third body keel bracket 44; the second body heel opening 46, arranged through the third body keel bracket opening that is perpendicular to the third body heel bracket port, and a body keel bracket rod 64, inserted through the first body heel bracket port 38, the second body heel bracket port 60, and the third body heel bracket port 62; wherein the first body weight is joined to the body keel bracket rod at the body keel bracket opening, wherein the second body weight is joined to the third body keel bracket at the third body heel bracket opening.

Figure 4:
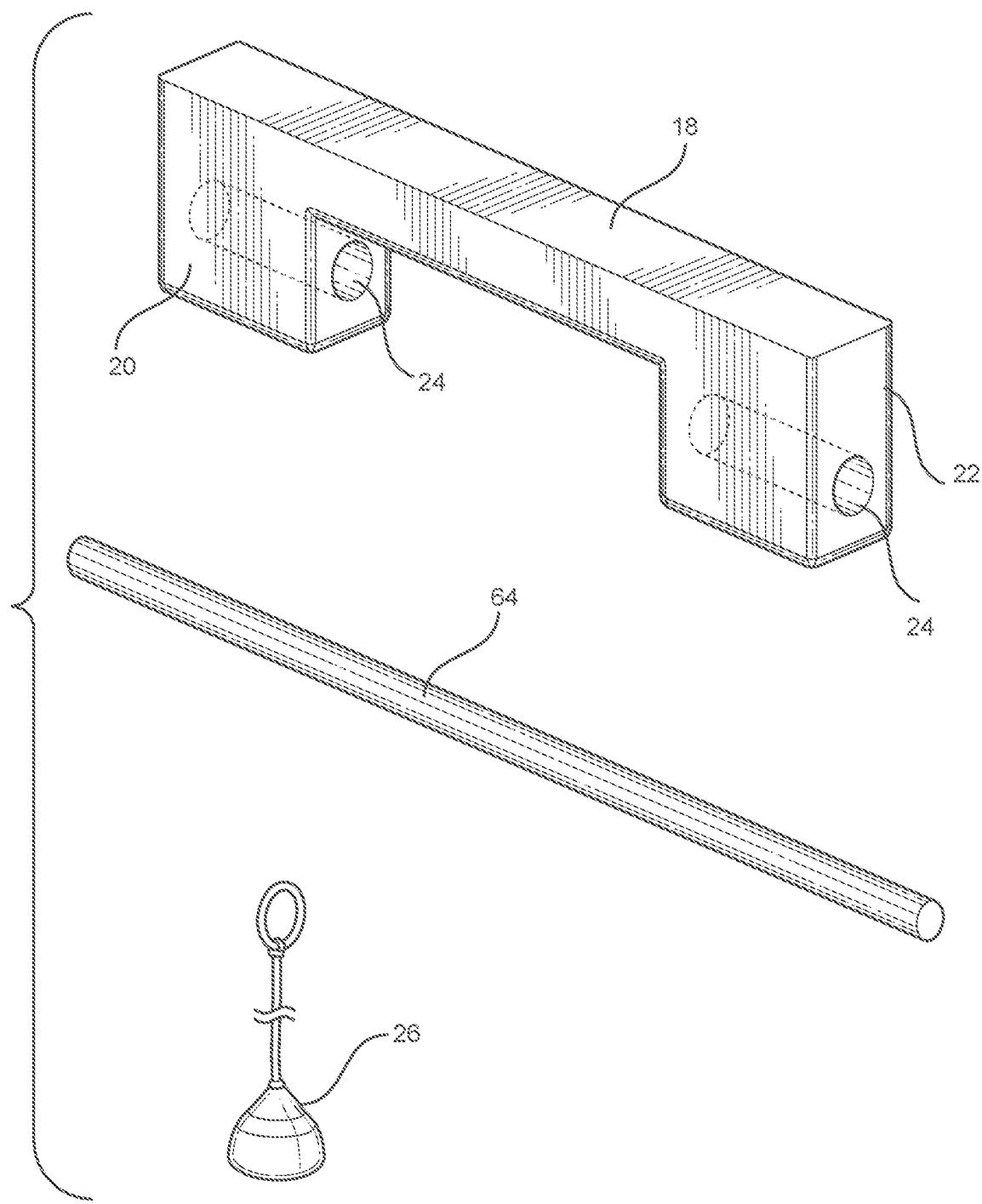
FIG. 4 shows an exploded view of the bracket assembly including, the body keel bracket rod and a bracket weight.

By way of example and referring to FIG. 4 the system for an adjustable Ballast Keel floating decoy 10 further comprising of a multiplicity of varied weights anchored on the rod 64 inserted into the inner cavity of the brackets through port holes such that said weights could be added or removed to achieve the desired buoyancy level and provides a means for stabilizing-preventing the violent bobbing or rocking of the decoy, as well as for preventing the capsizing of the decoy when the water is choppy and rough.

The embodiment of the adjustable Ballast Keel provides the ability to add weight through the keel's ports in varied degrees to address buoyancy levels in any floating objects and maintain them in upright floating position. Whereas, slight manipulation of the same weight left and right will correct any listing issues in the floating object.

In some embodiment of the adjustable Ballast Keel provides the ability to add weight through the keel's ports and can also produce ballast for lighted buoys where light beam needs to be directed to a specific level.

The embodiment of the adjustable Ballast Keel could be made using wood, metal, or plastic. An elongated piece of keel material will be taken first, and the middle section of the keel will be cut out creating an upside-down square "U" notch on the keel. Then the port holes will be drilled through the length of the keel. Thread length of malleable weight through the port holes and then bend downward to lock into place on the keel bracket. Curl excess length of malleable weight under the keel ends.

The embodiment of the adjustable Ballast Keel could be run in two pieces cross ways to provide adjustment in four different directions.

The embodiment of the adjustable Ballast Keel is mounted to the bottom of the floating decoys. Whereas, the weights are inserted into the keel bracket in sufficient degree until floating object rights itself in the desired position. Any left/right listing issues is corrected by manipulating the weight to the left or right until listing issue is resolved.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A decoy assembly, configured to have an adjustable buoyancy level; the decoy assembly comprising;
   a head assembly, further comprising a decoy head having a planar bottom surface;
   a head keel bracket, joined to the planar bottom surface, and further comprising a first head keel bracket joined to a second head keel bracket with a head keel opening therebetween;
   a head weight, joined to the head keel bracket and configured to lower a head assembly center of gravity;
   a body assembly, further comprising a decoy body having a body planar bottom surface and a head opening configured to accommodate the head assembly;
   a body keel bracket, joined to the body planar bottom surface, and further comprising a first body keel bracket joined to a second body keel bracket with a body keel opening therebetween; a third body keel bracket, joined to the second body keel bracket with a second body keel opening therebetween;
   a first body weight, joined to the body keel bracket and configured to lower a body assembly center of gravity;
   a second body weight, joined to the body keel bracket and configured to lower the body assembly center of gravity;
   wherein adjusting the body assembly center of gravity independently of the head assembly center of gravity provides lifelike movement for the decoy assembly.

2. The decoy assembly of claim 1, further comprising:
   a first head heel bracket port, arranged through the first head keel bracket;
   a second head heel bracket port, arranged through the second head keel bracket;
   a head keel bracket line, threaded through the first head heel bracket port and the second head heel bracket port;
   wherein the head keel bracket line is joined to the head weight with a head weight line.

3. The decoy assembly of claim 1, further comprising:
   a first body heel bracket port, arranged through the first body keel bracket;
   a second body heel bracket port, arranged through the second body keel bracket; a third body heel bracket port, arranged through the third body keel bracket;
   a body heel opening, arranged through a third body keel bracket opening that is perpendicular to the third body heel bracket port; and
   a body keel bracket rod, inserted through the first body heel bracket port, the second body heel bracket port, and the third body heel bracket port;
   wherein the first body weight is joined to the body keel bracket rod at a body keel bracket opening, wherein the second body weight is joined to the third body keel bracket at a third body heel bracket opening.

* * * * *